United States Patent [19]

Vu et al.

[11] Patent Number: 4,982,992
[45] Date of Patent: Jan. 8, 1991

[54] CLIP ON FLAT SUN VISOR

[76] Inventors: Thuan D. Vu, 323 18th St., Brooklyn, N.Y. 11215; George Spector, 233 Broadway RM 3815, New York, N.Y. 10007

[21] Appl. No.: 311,970

[22] Filed: Feb. 17, 1989

[51] Int. Cl.⁵ .............................................. B60J 3/02
[52] U.S. Cl. ................... 296/97.6; 296/97.11
[58] Field of Search ............ 296/97.6, 97.1, 97.8, 296/97.11

[56] References Cited

U.S. PATENT DOCUMENTS

| | | | |
|---|---|---|---|
| 2,894,576 | 7/1959 | Williams | 296/97.6 |
| 3,159,421 | 12/1964 | Samuelson | 296/97.8 |
| 3,351,375 | 11/1967 | Wheeler | 296/97.6 |
| 3,695,658 | 10/1972 | Vacha | 296/97.6 |
| 3,853,370 | 12/1974 | Barnhart | 296/97.6 |
| 3,948,554 | 4/1976 | Barbee | 296/97.6 |
| 3,988,033 | 10/1976 | Vacha | 296/97.6 |
| 4,681,363 | 7/1987 | Hemmeke et al. | 296/97.6 |
| 4,690,450 | 9/1987 | Boerema et al. | 296/97 |
| 4,783,111 | 11/1988 | Hemmeke et al. | 296/97.8 |

FOREIGN PATENT DOCUMENTS

| | | | |
|---|---|---|---|
| 1362640 | 4/1964 | France | 296/97.11 |
| 2310894 | 12/1976 | France | 296/97.6 |
| 0184925 | 8/1987 | Japan | 296/97.1 |

Primary Examiner—Dennis H. Pedder

[57] ABSTRACT

A glare shield which can easily be clipped on the conventional sun visor used in a motor vehicle wherein the glare shield is mounted on a bracket in a manner which provides up and down pivotal movement, lateral sliding and rotation transversely relative the sun visor.

1 Claim, 1 Drawing Sheet

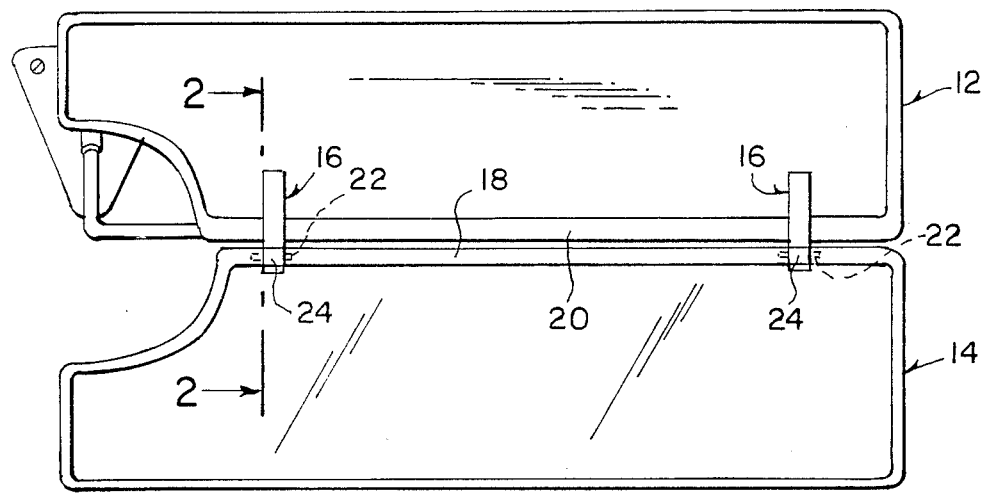
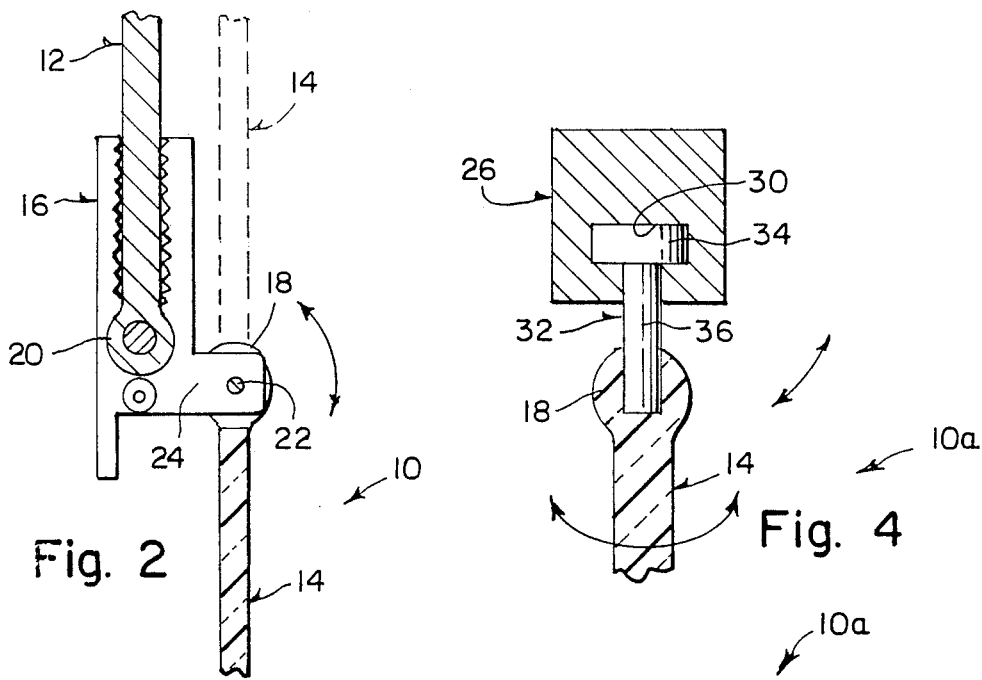
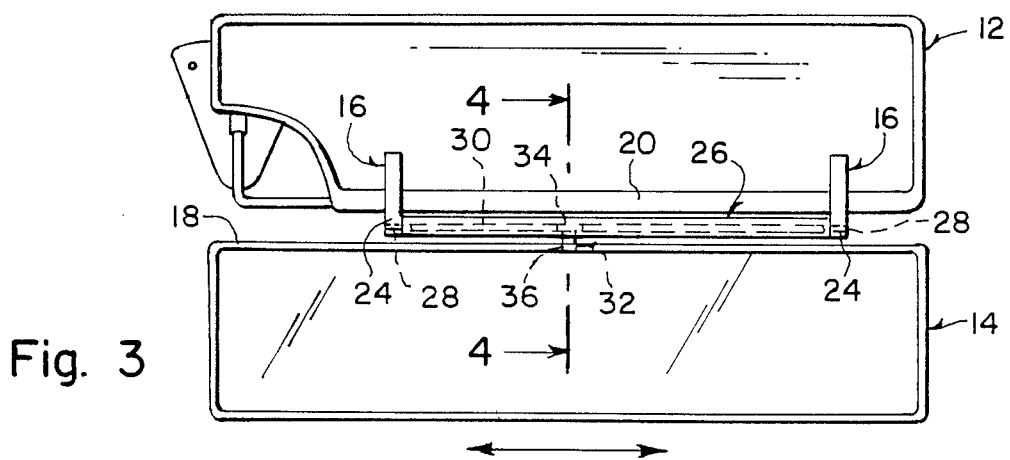

CLIP ON FLAT SUN VISOR

BACKGROUND OF THE INVENTION

The instant invention relates generally to motor vehicle sun visor attachments and more specifically it relates to a clip on glare shield for a sun visor.

Numerous motor vehicle sun visor attachments have been provided in prior art that are adapted to be connected to sun visors to block glare of light rays interfering with normal vision. For example, U.S. Pat. Nos. 3,695,658; 3,853,370 and 3,948,554 all are illustrative of such prior art. While these units may be suitable for the particular purpose to which they address, they would not be as suitable for the purposes of the present invention as heretofore described.

SUMMARY OF THE INVENTION

A primary object of the present invention is to provide a clip on glare shield for a sun visor that will overcome the shortcomings of the prior art devices.

Another object is to provide a clip on glare shield for a sun visor which can be quickly secured to the sun visor without using special tools for connection thereto.

An additional object is to provide a clip on glare shield for a sun visor which can be adjusted into various position with respect to the sun visor for additional blocking of the sun's rays from eyes of driver of a motor vehicle.

A further object is to provide a clip on glare shield for a sun visor that is simple and easy to use.

A still further object is to provide a clip on glare shield for a sun visor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front view of the sun visor in an up position and invention attached thereto with the guard member in a down intercepting position.

FIG. 2 is an enlarged cross sectional view taken along line 2—2 in FIG. 1 showing one of the alligator clips in greater detail.

FIG. 3 is a front view similar to FIG. 1 showing a modification in which the guard member is rotatably journaled by a bracket mounted slidably within a track in an elongated rod between the alligator clips so that the guard member can be universally adjusted.

FIG. 4 is an enlarged cross sectional view taken along line 4—4 in FIG. 3 showing the head and leg of the bracket in greater detail.

DETAILED DESCRIPTION OF THE PREFERRED EMBODIMENTS

Turning now descriptively to the drawings, in which similar reference characters denote similar elements throughout the several views, FIGS. 1 and 2 illustrate a clip on glare shield 10 for a sun visor 12 in a motor vehicle. A flat generally rectangular tinted transparent guard member 14 is provided for intercepting glaring light rays. A pair of alligator clips 16 are spaced apart along one side edge 18 of the guard member 14 for clipping the guard member onto a pivotable side edge 20 of the sun visor 12. A pivot pin 22 extends through one side 24 of each of the alligator clips 16 and into the side edge 18 of the guard member 14 for rotating the guard member of the alligator clips 16, into an up stored position and a down intercepting position.

FIGS. 3 and 4 show a modified glare shield 10a which includes an elongated rod 26 that has a pivot pin portion 28 formed at each end thereof and a track 30. Each pivot pin portion 28 extends through one side 24 of one of the alligator clips 16. A bracket 32 is provided that has a head 34 thereon which rotates and slides within the track 30 and a leg 36 that extends transversely from the rod 26 into center of the side edge 18 of the guard member 14. The guard member can pivot up and down, rotate and slide in track 30 with respect to the sun visor 12 for additional adjustment thereto for intercepting the glaring light rays.

The alligator clips 16 are simply clipped onto the sun visor 12 so that the guard member 14 can be flipped down so that the glaring light rays can be intercepted. In the modified glare shield 10a the guard member 14 can also rotate about and slide with respect to the sun visor 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A clip on glare shield for a sun visor in a motor vehicle comprising:
   (a) a flat generally rectangular tinted transparent guard member for intercepting glaring light rays;
   (b) means for clipping said guard member onto said sun visor;
   (c) means for rotating said guard member on said clipping means into an up stored position and a down intercepting position, wherein said clipping means includes a pair of alligator clips which are spaced apart along one side edge of said guard member; wherein said rotating means furthur includes:
   (d) an elongated rod having a pivot pin portion formed at each end thereof and a track therein, in which each said pivot pin portion extends through one side of one of said alligator clips and
   (e) a bracket having a head thereon which rotates and slides within the track and a leg that extends transversely from said rod into a center of the side edge of said guard member so that said guard member can pivot up and down, rotate and slide with respect to the sun visor for additional adjustment thereto for intercepting the glaring light rays.

* * * * *